Feb. 26, 1935.  H. J. LANGLEY  1,992,313
CULTIVATOR TOOTH
Filed Feb. 3, 1934
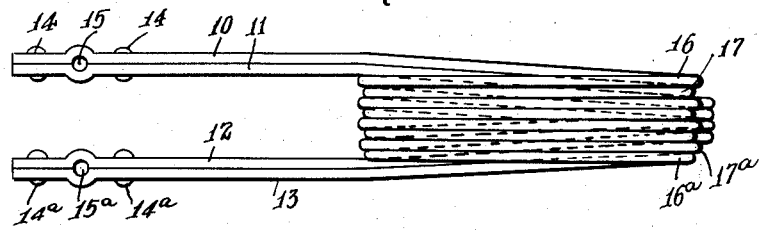
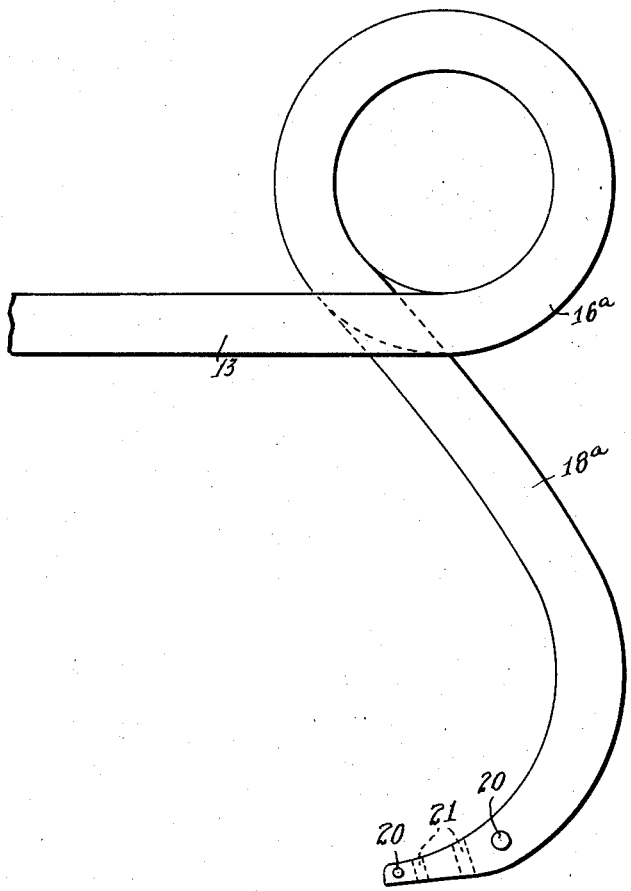
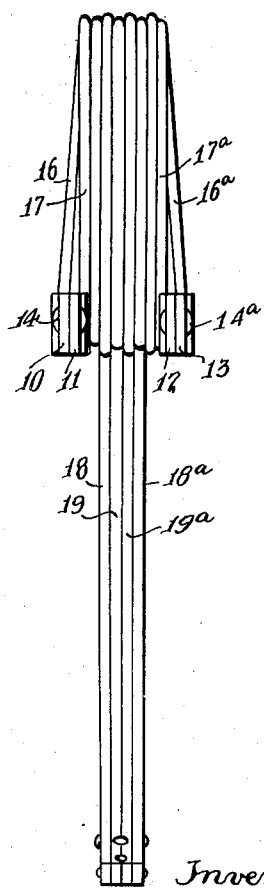
Inventor
Harry J. Langley
By Lyon+Lyon
Attorneys ced Feb. 26, 1935

1,992,313

UNITED STATES PATENT OFFICE 1,992,313

CULTIVATOR TOOTH

Harry J. Langley, Huntington Park, Calif., assignor to United States Spring & Bumper Co. Inc., Los Angeles, Calif., a corporation of California Application February 3, 1934, Serial No. 709,605

2 Claims. (Cl. 97—201)

This invention relates to a cultivator tooth of the spring type for use on harrows and other earth working tools.

Heretofore, it has been the practice to make a spring tooth whereby the resistance of the earth against the earth engaging end thereof would cause the coiled spring portion to unwind or open and thus to give the engaged end of the tooth a greater leverage over the spring and as a result thereof the spring would be over-stressed, resulting in either distortion or crystallization of the steel and final rupture thereof. Also, as the modern agricultural machines are being built heavier and greater penetration of the tools carried thereby into the soil is required, the spring tooth or teeth must be made heavier to withstand this additional work. However, should the spring tooth be made of sufficiently heavy stock to resist being distorted, it loses its resiliency or flexibility and, therefore, will not penetrate the soil to the desired depth.

It is, therefore, one of the principal objects of this invention to provide a spring tooth in which the spring coils will be wound up as the load is encountered by the earth engaging end thereof so as to rapidly increase the resistance of the tooth against excessive bending or deflection and thus prevent the structure from becoming overstrained or distorted.

A further object is to build up the spring tooth of a plurality of members whereby it may withstand the rough and heavy usage required of the tooth in the modern agricultural implements and yet have sufficient resiliency to enter the soil and perform its usual functions.

Other objects and advantages of the invention will become apparent as the nature of the same is more fully understood from the following description and accompanying drawing, wherein is set forth what is now considered to be a preferred embodiment. It should be understood, however, that this particular embodiment of the invention is chosen principally for the purpose of exemplification and that variations therefrom in details of construction or arrangement of parts may accordingly be effected and yet remain within the spirit and scope of the invention as the same is set forth in the appended claims.

In the drawing:

Figure 1 illustrates a plan view of the invention;

Figure 2 illustrates a side view of Figure 1;

Figure 3 illustrates a front end view of Figure 2;

The cultivator tooth, as illustrated in Figures 1, 2 and 3, is built up of four members, two right and two left-handed, but it will be appreciated that the structure may include single right and single left-handed member, or may be formed of any number of right and left-handed members. The number of members used in forming the right and left hand members may be governed to a large degree by the amount of work required of the tool.

As illustrated in Figures 1, 2 and 3, the structure may include two left-handed members 10 and 11 and two right members 12 and 13. As shown most clearly in Figure 1, the initial ends or shanks of members 10 and 11 may be fastened together as by two spaced rivets 14, and between the rivets the members may be forged or otherwise formed to provide a bolt hole 15 whereby the members may be securely fastened to the agricultural implement. From their initial ends, the members may be extended rearwardly in a horizontal plane until coiled edgewise into the coiled spring sections 16 and 17.

The number of coils may be greater or less than shown, depending upon the amount of give or resiliency required. The members upon leaving the coiled sections develop downwardly, as at 18 and 19, to form the tool carrying shank of the structure. It will be noted that the shanks 18 and 19 drop directly below the coils, whereby they are given a minimum of leverage over the spring coils thereof. This would not be the case should the shanks be extended rearwardly for a short distance before dropping down to form the tool receiving shank.

The right-hand members 12 and 13 may be in all respects similar to the left-hand members, except that the horizontal ends or shanks are positioned to the right of their coiled sections instead of to the left thereof, as in the case of the members 10 and 11, so that the four tool carrying shanks may develop downward as a single member.

For convenience, the corresponding portions of the right members have been given the same numbers as those used for the left-hand members with the addition of the letter "a" thereto.

The tool carrying ends of shanks 18—19, 18a and 19a may be securely fastened together, as by means of the spaced rivets 20, and holes 21 may be provided for the purpose of fastening any suitable form of earth working tool thereto.

It will be understood that each of the members may be made of hardened metal, such as spring steel, and properly heat treated.

One or more of the cultivator teeth just described may be fastened to any appropriate kind of agricultural implement and the desired form of earth working tool may be fastened to each tooth.

An agricultural implement equipped with one or more of the cultivator teeth just described will readily penetrate the soil to a greater depth due to its greater resiliency than would be the case of a spring tooth formed of a single member, and distortion and breaking of the tooth will be practically eliminated.

Having fully described the invention, it is to be understood that it is not to be limited to the details herein set forth, but the invention is of the full scope of the appended claims.

I claim:

1. A cultivator tooth including a plurality of right-hand members, a plurality of left-hand members, each of said members having a similarly formed attaching shank, a tool carrying shank and a spring coil formed therebetween, and means for fastening all of said members into a single unit.

2. A cultivator tooth including a plurality of right-hand members, a plurality of left-hand members, each of said members having a similarly formed attaching shank, a tool carrying shank and a spring coil formed therebetween, the said spring coil being all formed to wind up as the tool carrying shanks are deflected under load, and means for fastening all of said members into a single unit.

HARRY J. LANGLEY.